US006614001B2

(12) United States Patent
Hackett et al.

(10) Patent No.: US 6,614,001 B2
(45) Date of Patent: Sep. 2, 2003

(54) NOZZLE FOR PLASMA ARC TORCH

(75) Inventors: Charles M. Hackett, Hanover, NH (US); Yutaka Nakano, Enfield, NH (US); Zhipeng Lu, Hanover, NH (US); Aaron D. Brandt, W. Lebanon, NH (US); Brian J. Currier, Newport, NH (US); Kenneth J. Woods, Lebanon, NH (US)

(73) Assignee: Hypertherm, Inc., Hanover, NH (US)

(*) Notice: Subject to any disclaimer, the term of this patent is extended or adjusted under 35 U.S.C. 154(b) by 0 days.

(21) Appl. No.: 10/152,061

(22) Filed: May 21, 2002

(65) Prior Publication Data

US 2002/0135283 A1 Sep. 26, 2002

Related U.S. Application Data

(62) Division of application No. 09/631,814, filed on Aug. 3, 2000, now Pat. No. 6,424,082.

(51) Int. Cl.$^{7}$ .................................................. B23K 9/02

(52) U.S. Cl. .................................................. 219/121.59

(58) Field of Search ......................... 219/121.5, 121.48, 219/121.59, 121.51, 121.52, 75; 313/231.31, 231.41

(56) References Cited

U.S. PATENT DOCUMENTS

| | | | | | |
|---|---|---|---|---|---|
| 3,592,994 | A | | 7/1971 | Ford | |
| 3,767,218 | A | | 10/1973 | Linthicum et al. | |
| 4,140,892 | A | * | 2/1979 | Muller | 219/121.5 |
| 4,389,559 | A | * | 6/1983 | Rotolico et al. | 219/121.5 |
| 4,558,201 | A | * | 12/1985 | Hatch | 219/121 |
| 4,559,439 | A | | 12/1985 | Camacho et al. | |
| 4,739,147 | A | | 4/1988 | Meyer et al. | |
| 4,777,342 | A | | 10/1988 | Hafner | |
| 4,777,343 | A | | 10/1988 | Goodwin | |
| 4,791,268 | A | | 12/1988 | Sanders et al. | |
| 5,208,442 | A | * | 5/1993 | Ahola et al. | 219/121.52 |
| 5,409,322 | A | | 4/1995 | Horikawa et al. | |
| 5,444,209 | A | * | 8/1995 | Crawmer et al. | 219/121.52 |
| 5,473,131 | A | | 12/1995 | Sperling | |
| 5,676,864 | A | * | 10/1997 | Walters | 219/121.52 |
| 5,695,662 | A | * | 12/1997 | Couch, Jr. et al. | 219/121.39 |
| 5,841,095 | A | | 11/1998 | Lu et al. | |
| 5,856,647 | A | * | 1/1999 | Luo | 219/121.5 |
| 5,886,315 | A | | 3/1999 | Lu et al. | |
| 5,994,663 | A | | 11/1999 | Lu | |
| 6,025,571 | A | | 2/2000 | Walters et al. | |
| 6,080,955 | A | | 6/2000 | Schwankhart | |
| 6,084,199 | A | | 7/2000 | Lindsay et al. | |

FOREIGN PATENT DOCUMENTS

| | | |
|---|---|---|
| EP | 0 529 850 A2 | 3/1993 |
| EP | 1 061 782 A2 | 12/2000 |

* cited by examiner

*Primary Examiner*—Mark Paschall
(74) *Attorney, Agent, or Firm*—Testa, Hurwitz & Thibeault, LLP

(57) ABSTRACT

An output structure for material processing apparatus facilitates field replacement of consumable components, while maintaining important alignments. Contoured surfaces within the output structure mate with corresponding contoured surfaces on the consumable components, thereby facilitating alignment of the consumable components with an axis of the output structure. Material processing apparatus employing such surfaces include lasers and plasma arc torches and, with proper alignment, apparatus performance is improved. Typical consumable components include electrodes, swirl rings, nozzles, and shields. The consumable components can be axially translatable with respect to each other, thereby promoting contact starting of a plasma arc torch. An installation tool for consumable components also serves to align the components with an axis of the output structure.

8 Claims, 5 Drawing Sheets

NOZZLE FOR PLASMA ARC TORCH

CROSS-REFERENCE TO RELATED APPLICATION

This application is a divisional application of, and claims priority to, U.S. patent application Ser. No. 09/631,814, filed Aug. 3, 2000, now U.S. Pat. No. 6,424,082, the disclosure of which is incorporated herein by reference in its entirety.

FIELD OF THE INVENTION

The present invention relates generally to the design and manufacture of material processing apparatus and, more specifically, to consumables used in the apparatus and methods for aligning the consumables with an axis of the apparatus.

BACKGROUND OF THE INVENTION

Material processing apparatus, such as plasma arc torches and lasers, are widely used in the cutting, welding, and heat treating of metallic materials. A plasma arc torch generally includes a cathode block with an electrode mounted therein, a nozzle with a central exit orifice mounted within a torch body, electrical connections, passages for cooling and arc control fluids, a swirl ring to control fluid flow patterns in the plasma chamber formed between the electrode and nozzle, and a power supply. The torch produces a plasma arc, which is a constricted ionized jet of a plasma gas with high temperature and high momentum. Gases used in the torch can be non-reactive (e.g. argon or nitrogen), or reactive (e.g. oxygen or air).

Similarly, a laser-based apparatus generally includes a nozzle into which a gas stream and laser beam are introduced. A lens focuses the laser beam which then heats the workpiece. Both the beam and the gas stream exit the nozzle through an orifice and impinge on a target area of the workpiece. The resulting heating of the workpiece, combined with any chemical reaction between the gas and workpiece material, serves to heat, liquefy or vaporize the selected area of workpiece, depending on the focal point and energy level of the beam. This action allows the operator to cut or otherwise modify the workpiece.

Certain components of material processing apparatus deteriorate over time from use. These "consumable" components include, in the case of a plasma arc torch, the electrode, swirl ring, nozzle, and shield. Ideally, these components are easily replaceable in the field. Nevertheless, the alignment of these components within the torch is critical to ensure the reasonable consumable life, as well as accuracy and repeatability of plasma arc location, which is important in automated plasma arc cutting systems.

In a plasma arc torch, the location and angularity of the arc is determined by the relative location of the electrode and nozzle or, more specifically, the location of an insert disposed in a tip of the electrode relative to a centerline of the nozzle orifice. Since the plasma gas flowing through the orifice tends to center the arc in the orifice, it is desirable that the insert is concentrically aligned with the orifice, as any misalignment skews the arc relative to the centerline datum of the torch. As used herein, the term "axially concentric" and variants thereof mean that the centerlines of two or more components are substantially collinear. Depending on the direction of cut, any misalignment can result in the production of parts with improper dimensions and non-normal edges. Asymmetric wear of the nozzle orifice also typically results, requiring premature replacement of the nozzle.

Tolerances associated with conventional methods of mounting the electrode and nozzle render systems employing such torches incapable of producing highly uniform, close tolerance parts due to the errors inherent in positioning the electrode relative to the nozzle. One method of mounting the electrode and nozzle employs close tolerance sliding fits. For example, a cathode block having a bore for receiving a base of the electrode has a nominal diameter of 0.272 inches (0.691 cm) with a machining tolerance band of plus or minus 0.001 inches (0.003 cm). Accordingly, the bore can have a maximum diameter of 0.273 inches (0.693 cm) and a minimum diameter of 0.271 inches (0.688 cm). In order to ensure the electrode can be inserted reliably in the block without interference, the electrode base has a nominal diameter of 0.270 inches (0.689 cm) with a machining tolerance band of plus or minus 0.001 inches (0.003 cm). Accordingly, the electrode base can have a maximum diameter of 0.271 inches (0.688 cm) and a minimum diameter of 0.269 inches (0.683 cm). The diametral clearance between the base and bore can range between zero and 0.004 inches (0.010 cm) yielding a maximum radial displacement of the electrode relative to a centerline of the torch of 0.002 inches (0.005 cm). This maximum radial displacement is also called the worst case stacking error which results from employing a minimum allowable diameter electrode base with a maximum allowable diameter cathode block bore.

The worst case stack error of the nozzle is added to that of the electrode to determine the combined total maximum radial displacement for the nozzle and electrode in the torch. Calculation of nozzle location error is similar to that of the electrode. For example, a torch body having a bore for receiving a base of the nozzle has a nominal diameter of 0.751 inches (1.908 cm) with a machining tolerance band of plus or minus 0.001 inches (0.003 cm). Accordingly, the bore can have a maximum diameter of 0.752 inches (1.910 cm) and a minimum diameter of 0.750 inches (1.905 cm). In order to ensure the nozzle can be inserted reliably in the body without interference, the nozzle base has a nominal diameter of 0.747 inches (1.897 cm) with a machining tolerance band of plus or minus 0.002 inches (0.005 cm). The larger tolerance band is attributable to the increased difficulty of machining larger diameter parts to close tolerances reliably at reasonable cost. Accordingly, the nozzle base can have a maximum diameter of 0.749 inches (1.902 cm) and a minimum diameter of 0.745 inches (1.892 cm). The diametral clearance between the base and bore can range between 0.001 inches (0.003 cm) and 0.007 inches (0.018 cm) yielding a maximum radial displacement of the nozzle relative to a centerline of the torch of 0.0035 inches (0.0089 cm).

The combined total maximum radial displacement of the nozzle relative to the electrode is the sum of the individual maximum radial displacements or 0.0055 inches (0.0140 cm). For a torch having an axial distance between a tip of the electrode insert and an entrance to the nozzle orifice of 0.140 inches (0.3556 cm), the angularity of the arc relative to the torch centerline may be related to the angularity of the consumables relative to the torch centerline, the latter of which is calculated geometrically as about 2.25 degrees. Accordingly, if the axial distance from the tip of the insert to the workpiece surface is 0.274 inches (0.696 cm), the maximum dimensional error from the centerline of the torch projected on the workpiece to the actual entrance of a cut on the workpiece may be calculated geometrically as about 0.0108 inches (0.0274 cm). Depending on the direction of arc misalignment and the direction of the cut, the component cut from the workpiece may have cut edge angularity of 2.25 degrees and the dimensional error of the finished part may be up to twice the 0.0108 inches (0.0274 cm), or 0.0216 inches (0.0549 cm), in the case where opposite edges of the workpiece are both cut with the maximum skew. This magnitude of errors is unacceptable for reliably producing parts and features therein having total dimensional tolerance of between about plus or minus 0.005 inches (0.013 cm) and about plus or minus 0.010 inches (0.025 cm). Further, for a small nominal diameter nozzle orifice such as 0.018 inches (0.046 cm), the combined maximum radial displacement of 0.0055 inches (0.0140 cm) and angularity of 2.25 degrees result in asymmetric wear of the nozzle entailing premature replacement.

Diametral tolerances of plus or minus 0.001 inches (0.003 cm) for each of an electrode base, cathode block bore, and torch body bore and plus or minus 0.002 inches (0.005 cm) for a nozzle base are necessary to ensure the capability to replace readily the consumable components in the field. While tighter tolerances could be employed, such practices typically would entail higher manufacturing costs and likely complicate the field replacement of the consumables. Attempts to rely on O-rings for sealing the radial clearances as well as centering are ineffective since there exists substantial inherent variation in the molded cross-sectional profiles of O-rings.

Instead of using close tolerance sliding fits, the electrode and nozzle may be mounted on the cathode block and torch body, respectively, by means of screw threads. Based upon thread data tabulated in Machinery's Handbook, 24th Edition (Industrial Press, Inc. 1992), for an electrode and cathode block pair employing a 5/16-20 UN thread, the worst case stack clearance based upon pitch diameter is 0.0104 inches (0.0264 cm) yielding a maximum radial displacement of the electrode centerline relative to the torch centerline of 0.0052 inches (0.0132 cm). For a nozzle and torch body employing a ¾-12 UN thread, the worst stack clearance based upon pitch diameter is 0.0144 inches (0.0366 cm) yielding a maximum radial displacement of the electrode centerline relative to the torch centerline of 0.0072 inches (0.0183 cm). Accordingly, the combined total maximum radial displacement is 0.0124 inches (0.0315 cm) yielding an angular error of 5.06 degrees and a dimensional error of 0.0242 inches (0.0615 cm) for a torch having similar axial dimensions as in the aforementioned example. While more precise threads could be employed, manufacturing costs would increase as well the difficulty associated with assembly and disassembly, especially since the threads are subject to surface degradation and thermal deformation in use.

Another method of providing axially concentric alignment of the electrode and nozzle involves the use of mating taper fits with the respective cathode block and torch body. While improved concentricity may be achieved, relative and absolute axial location of the electrode and nozzle suffer. In effect, tapers convert radial errors to axial errors. For example, for a nominal taper included angle of 30 degrees relative to torch centerline and a tolerance of plus or minus 30 minutes, the maximum axial displacement of an electrode relative to a cathode block is about 0.0047 inches (0.0120 cm).

Component axial accuracy is important for proper torch operation. For example, numerous elements are nested in the torch assembly, many of which are captured, such as the swirl ring disposed between the electrode and nozzle. Accordingly, it would be very difficult to ensure seating of both electrode and nozzle tapers while meeting the requisite axial stacking dimension of interdisposed components. Further, the relative distance between the electrode and the nozzle should be controlled within a narrow range. The distance therebetween should be large enough to provide for reliable pilot arc initiation, yet not so large as to exceed the breakdown voltage of the power supply in arc initiation mode. Additionally, and perhaps more importantly, the length of the transferred arc from the tip of the electrode at the insert to the workpiece should be closely controlled to achieve proper control of the power and proper processing of the workpiece. Changes in arc length affect arc voltage, which in turn effects other critical processing parameters in the power supply.

Another method of providing axially concentric alignment of consumables in a plasma arc torch is disclosed in U.S. Pat. No. 5,841,095 to Lu, et. al., and assigned to the assignee of this application. The disclosure of this patent is incorporated herein by reference in its entirety. Briefly, this patent discloses centering of electrodes and nozzles in plasma arc torches using radial spring elements. It has been determined, however, that at higher electrical current carrying requirements, such radial spring elements increase significantly in size and require major redesign of the cathode block, current ring, and other components of the torch tip or output structure.

Accordingly, there exists a need to improve upon the current state of the art by providing low-cost, readily-manufacturable, and easily-replaceable consumables in a streamlined output structure of a material processing apparatus, where the alignment and concentricity of consumable components in the output structure can be closely controlled. The capability to retrofit existing apparatus with minimal modification is also highly desirable.

SUMMARY OF THE INVENTION

In one embodiment, the invention provides an output structure for material processing apparatus that facilitates field replacement of consumable components while maintaining critical alignments. By ensuring the proper alignment of the consumables, the accuracy of apparatus operation and the lifetimes of the consumables are improved.

The output structure includes a contoured alignment surface and a consumable component that also has a contoured surface. When installed in the apparatus, the contoured surface of the consumable component mates with the contoured alignment surface of the output structure. This mating action serves to facilitate alignment of the consumable component with an axis of the output structure.

Examples of typical material processing apparatus include plasma arc torches and lasers. In some embodiments, the consumable component is an electrode, a swirl ring, a nozzle or a shield. The contoured surfaces include linear tapers and arcuate sections in any combination. For example, in an embodiment including an electrode, an outer surface of the electrode is contoured over an axial extent of less than about 0.5 inches (1.27 cm) and, in some embodiments, less than about 0.25 inches (0.635 cm). In an embodiment incorporating an electrode with a linear taper, the angle formed between the taper and the axis of the electrode can be any value less than 90 degrees. In an embodiment incorporating an electrode with a contoured surface that is an arcuate section, the arcuate section can have a fixed radius of curvature or several radii of curvature.

In one embodiment, a plasma arc torch includes a consumable swirl ring, the swirl ring having a surface contoured over an axial extent of, for example, less than about 0.5 inches (1.27 cm). The contoured surface may be linear taper surface where the angle formed between the taper and the axis of the swirl ring can be any value less than 90 degrees, for example, less than about 45 degrees. In another embodiment, the contoured surface may be an arcuate section defined by a fixed radius of curvature or several radii of curvature.

In another embodiment, a plasma arc torch includes a consumable nozzle, the nozzle having a surface contoured over an axial extent of, for example, less than about 0.5 inches (1.27 cm). The contoured surface may be linear taper surface where the angle formed between the taper and the axis of the nozzle can be any value less than 90 degrees, for example, less than about 45 degrees. In another embodiment, the contoured surface may be an arcuate section defined by a fixed radius of curvature or several radii of curvature.

In yet another embodiment, a plasma arc torch includes a consumable shield, the shield having a surface contoured over an axial extent of, for example, less than about 0.5 inches (1.27 cm). The contoured surface may be a linear taper surface where the angle formed between the taper and the axis of the shield can be any value less than 90 degrees, for example, less than about 45 degrees. In another embodiment, the contoured surface may be an arcuate section defined by a fixed radius of curvature or several radii of curvature.

To provide axial retention upon installation in the output structure, the consumable component may include a threaded surface for engaging a cooperating thread of the output structure. Alternatively, in "blow forward" or "blow back" type plasma arc torches, such as those described in U.S. Pat. Nos. 5,994,663 and 4,791,268, respectively, the disclosures of which are incorporated herein by reference in their entirety, the electrode or nozzle can translate axially in the torch from a contact start position to a separated pilot arc position using a sliding fit in a suitably sized bore. In such an embodiment, one or more spring elements may be included to bias at least one of the components in the axial direction. Accordingly, during operation of the torch the consumable is seated in an aligned orientation and maintained at the correct axial location due to the pressure in the plasma chamber.

In another embodiment of the invention, the output structure includes a second contoured alignment surface and a second consumable component that also has a contoured surface. Similar to the embodiment discussed above, the contoured surface of the second consumable component mates with the second contoured alignment surface of the output structure. This facilitates alignment of the second consumable component with the same axis of the output structure, such that both consumables are concentrically aligned.

In some embodiments, the second consumable component can be an electrode, a swirl ring, a nozzle, or a shield. The second contoured alignment surface, as well as the contoured surface of the second consumable component, can be, by way of example, linear taper surfaces or arcuate sections.

To retain its axial position within the output assembly, the second consumable component may include a threaded surface that engages a cooperating thread on the output structure, or may include a sliding fit in a suitable sized bore as discussed above for translatable component designs.

In another embodiment of the invention, a tool is used for installing and aligning a consumable component with an axis of the output structure of a material processing apparatus. The tool typically has a body with an outer contoured mating surface for mating with a contoured surface of the output structure. Further, the body generally includes a bore with an inner drive surface. The bore is sized to receive the consumable component and the inner drive surface engages a keyed surface of the consumable component. The tool may be used to thread the consumable component onto a threaded surface of the output structure, while simultaneously providing radial support to center the electrode. In some embodiments, the consumable component may also include a deformable surface that conforms to the output structure so as to maintain alignment with the axis of the output structure when the tool is removed.

In an embodiment where two consumable components are aligned with the axis of the output structure as described above, the components are consequently also concentrically aligned with each other. This is exemplified by a nozzle which, as the second consumable component, is typically installed so as to circumscribe the previously installed consumable electrode. In this configuration, the output structure, electrode, and nozzle all share a common axis. In an alternative embodiment, a third consumable component, such as a swirl ring, is also centered and shares the common axis.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION OF THE DRAWINGS

Figure 1:
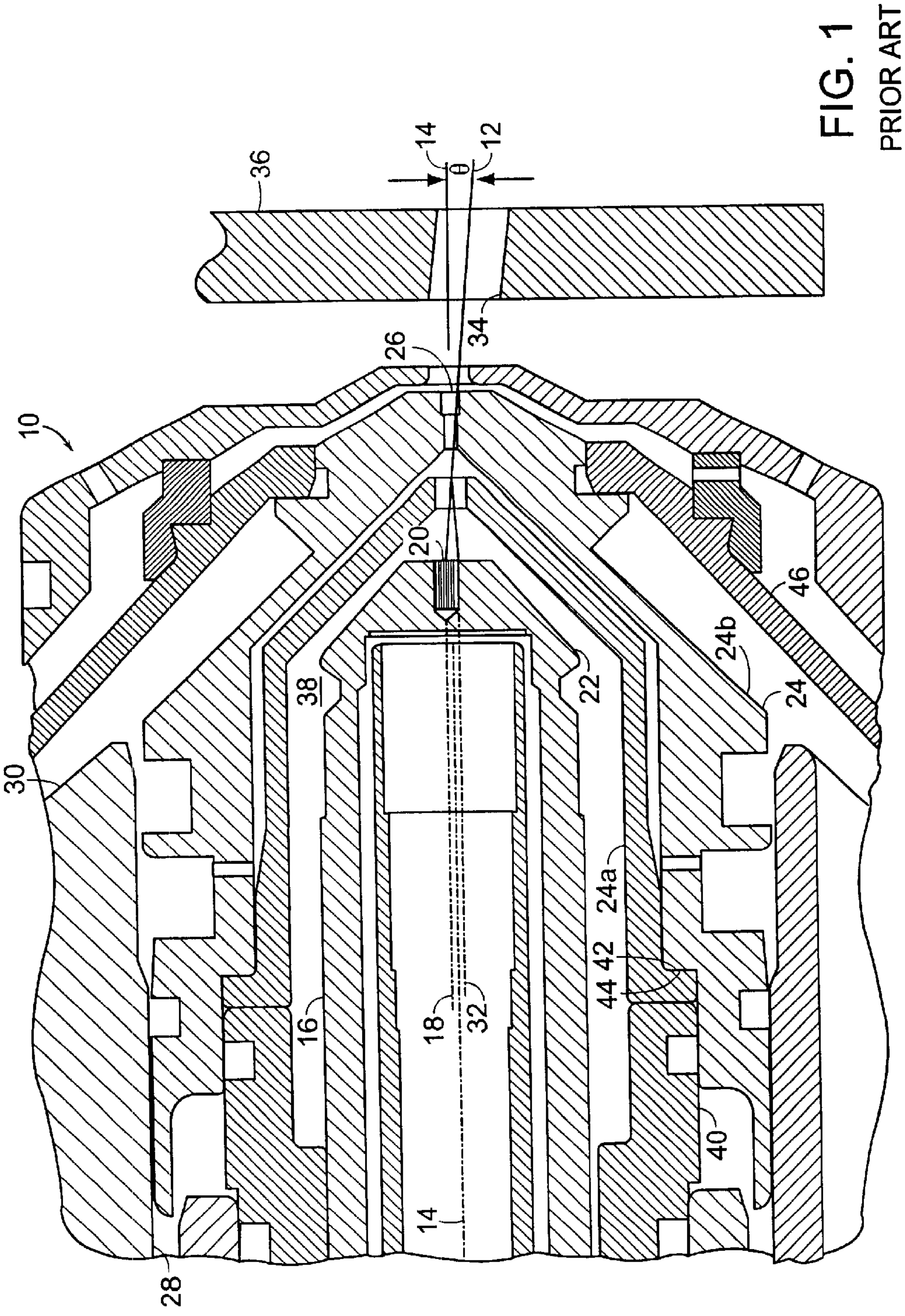
FIG. 1 PRIOR ART
FIG. 1 is a schematic sectional view of an output structure of a prior art plasma arc torch, depicting misalignment of an arc path relative to torch centerline.

As shown in the drawings for the purposes of illustration, the invention is embodied in an output structure of a material processing apparatus. A system according to the invention facilitates field replacement of consumable components mounted within the output structure while providing and maintaining important alignments.

An output structure for material processing apparatus according to the invention includes consumable elements that incorporate contoured surfaces. The invention avoids the field replacement and alignment problems discussed above. Furthermore, embodiments are readily manufacturable and machining can be accomplished with a single setup using multiple stops to eliminate errors inherent with multiple setups.

In the following detailed description and the drawings, like elements are identified with like reference numerals.

In brief overview, FIG. 1 shows a schematic sectional view of an output structure of a prior art plasma arc torch 10 depicting angular misalignment theta of an arc path 12 relative to a torch centerline 14. As discussed above with respect to the limitations inherent in conventional torches with close tolerance sliding fits, electrode 16 is mounted in a bore of a cathode block (not depicted) and includes an axial electrode centerline 18 passing through insert 20, disposed in a tip 22 of the electrode 16. Due to the radial clearance of the sliding fit between the electrode 16 and cathode block, the electrode centerline 18 is typically displaced radially from the torch centerline 14, depicted in FIG. 1 as being in an upward direction.

In this torch 10, a nozzle 24 includes a nozzle inner member or liner 24*a* disposed proximate the electrode 16 and a circumscribing nozzle outer member or shell 24*b* including an orifice 26 through which the arc passes. The liner 24*a* is nested in the shell 24*b* which is disposed in a bore 28 of torch body 30. A plasma chamber 38 is formed in the annular volume defined by the electrode 16, nozzle 24, and a swirl ring 40. Due to the radial clearance of the sliding fit between the nozzle 24 and torch body 30, an axial nozzle centerline 32 is typically displaced radially from the torch centerline 14, depicted in FIG. 1 as being in an downward direction. This configuration depicts the worst case stack or maximum radial displacement error for the assembly. Accordingly, since the arc originates at a central location on the electrode insert 20 and passes through a center of the orifice 26, angular misalignment of the arc path 12 can be calculated geometrically given the axial dimension therebetween. The resulting kerf 34 produced in a workpiece 36 by the arc is both skewed and radially offset from a true position projection of the torch axis 14 on the workpiece 36. The maximum angular misalignment and radial offset are a function of the radial clearances between the electrode 16, nozzle 24, and respective bores of the block and body 30 in the assembly and the axial distance between the insert 20 and surface of the workpiece 36.

By reducing the radial displacement of the electrode centerline 18 and nozzle centerline 32 relative to the torch centerline 14, both skew and radial offset of the arc path 12 can be minimized or substantially eliminated.

Figure 2:
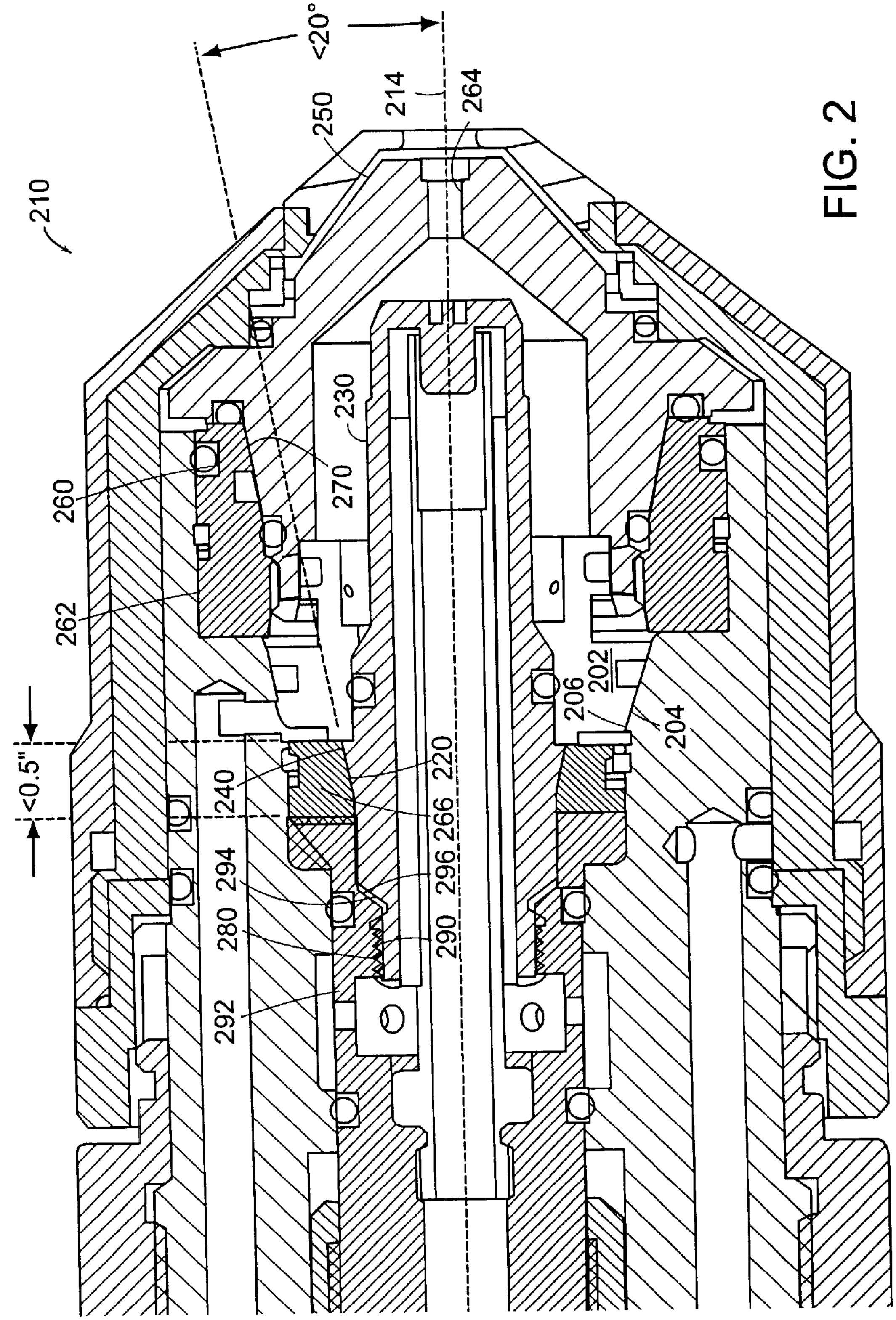
FIG. 2 is a schematic sectional view of a portion of a plasma arc torch with radially centered consumable components in accordance with an embodiment of the present invention.

FIG. 2 shows an embodiment of an output structure of a material processing system, specifically the lower body portion of the output structure, or "working end," of a plasma arc torch 210. The plasma arc torch 210 is similar to the torch 10, but with radially centered consumable components (an electrode 230, a swirl ring 202, and a nozzle 250). The plasma arc torch 210 has a centrally disposed longitudinal axis 214 and includes first, second and third contoured alignment surfaces 220, 270, 206, respectively. The electrode 230 includes a contoured mating surface 240 for mating with the first contoured alignment surface 220, the contour having an axial extent of less than about 0.5 inches (1.27 cm) and, in some embodiments, less than about 0.25 inches (0.635 cm) As the electrode 230 is installed in the plasma arc torch 210, the contoured mating surface 240 contacts the first contoured alignment surface 220 centering the electrode 230, thereby causing the longitudinal axis of the electrode 230 to align with the torch axis 214.

Similarly, the nozzle 250 includes a contoured mating surface 260 that mates with the second contoured alignment surface 270. The contour of the contoured mating surface 260 has an axial extent of less than about 0.5 inches (1.27 cm). For attachment to adjacent structure, the nozzle 250 may also include a threaded surface that engages a cooperating threaded surface on adjacent structure, shown generally at 262.

As depicted in FIG. 2, when the nozzle 250 is installed in the plasma arc torch 210, the contoured mating surface 260 contacts the contoured alignment surface 270. This causes the longitudinal axis of the nozzle 250 and the orifice 264 to align with the torch axis 214.

The contoured mating surface 240 is shown in FIG. 2 as a linear taper surface. The volume and configuration of the plasma arc torch 210 typically limits the axial extent of and angle formed between the contoured mating surface 240 and the axis of the electrode 230. Although smaller angles can be expected to yield better axial alignment, at very small angles they can cause the electrode 230 to become seized within the plasma arc torch 210. Consequently, removal and replacement of the electrode 230 can be difficult. Axial extent of about 0.2 inches to 0.3 inches (0.508 cm to 0.762 cm) and an angle ranging from about 5 degrees to about 15 degrees are common in existing torch designs modified to incorporate the invention.

The swirl ring 202 includes a contoured mating surface 204 that mates with the third contoured alignment surface 206. The contour of the contoured mating surface 204 has an axial extent of less than about 0.5 inches (1.27 cm). For attachment to adjacent structure, the swirl ring 202 may also include a threaded surface that engages a cooperating threaded surface on adjacent structure. In general) however, the swirl ring 202 is simply captured in the torch 210. In either configuration, it is desirable to center the swirl ring 202 about the electrode 230 so as to provide a concentric uniform annular plasma chamber to provide uniform gas flow therein and facilitate torch operation.

In general, the taper angle formed between the contoured mating surface 240 and the axis of the electrode 230 is less than about 90 degrees, preferably less than about 45 degrees and, more preferably, less than about 20 degrees. Likewise, the contoured mating surface 204 of the swirl ring 202, also shown as a linear taper surface in FIG. 2, has a taper angle formed between contoured mating surface 204 and the axis of the swirl ring 202 that is less than about 45 degrees. Similarly, the contoured mating surface 260 of the nozzle 250, also shown as a linear taper surface in FIG. 2, has a taper angle formed between contoured mating surface 260 and the axis of the nozzle 250 that is less than about 45 degrees.

Figure 3:
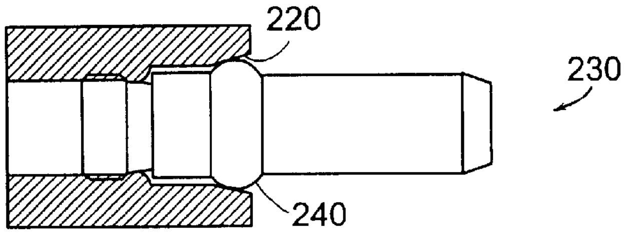
FIG. 3 is a schematic sectional view of an electrode used in a plasma arc torch showing a arcuate mating surface of the electrode and a linear tapered alignment surface of the torch body.
Figure 4:
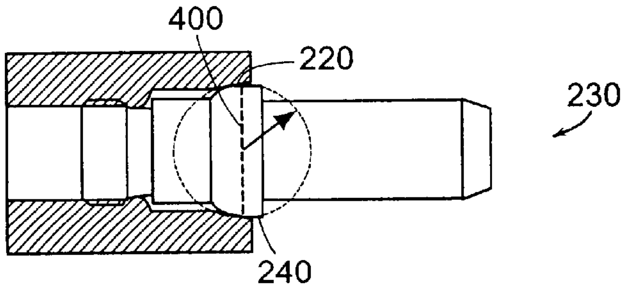
FIG. 4 is a schematic sectional view of an electrode used in a plasma arc torch showing the line contact that results when a linear tapered alignment surface mates with an arcuate surface.

Although the first, second, and third contoured alignment surfaces 220, 270, 206 as well as contoured mating surfaces 240, 260, 204 are shown in FIG. 2 as linear taper surfaces, one or more of these could take the form of an arcuate section with a predetermined radius of curvature. For example, as shown in FIG. 3, the first contoured alignment surface 220 could be in the form of a linear taper surface and the contoured mating surface 240 of the electrode 230 could be an arcuate section. An advantage of this configuration is shown in FIG. 4. A line contact 400 is formed where the surfaces 220 and 240 meet. This contrasts with the area contact that results when linear taper surfaces meet. Because the surface area of the line contact 400 is less than that of an area contact, the former is less susceptible than the latter to misalignment due to contamination from the typical harsh environments where a material processing apparatus, such as a plasma arc torch, is used. Since contamination of surfaces in contact can cause the surfaces to become seized, the arrangement of a linear taper surface in contact with a surface in the form of an arcuate section reduces the likelihood of this. Furthermore, an arcuate section is generally no more difficult to machine accurately than a linear taper surface.

Figure 5:
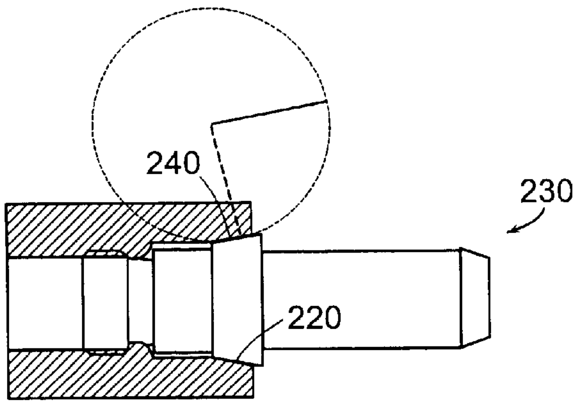
FIG. 5 is a schematic sectional view of an electrode used in a plasma arc torch showing a linear tapered mating surface of the electrode and an arcuate alignment surface of the torch body.

Another example of a surface mating configuration is shown in FIG. 5. Here, the contoured mating surface 240 of the electrode 230 is a linear taper surface and the first contoured alignment surface 220 is an arcuate section. As in the case above, a line contact forms between the surfaces 220, 240 and provides the same advantages detailed earlier.

Although FIGS. 3, 4, and 5 depict various configurations of linear tapers and contours on contoured alignment surface 220 and contoured mating surface 240 of an electrode 230, it should be noted that the same configurations are applicable to contoured alignment surface 270 and contoured mating surface 260 of the nozzle 250. These same configurations are also applicable to contoured alignment surface 206 and contoured mating surface 204 of the swirl ring 202. The advantages of a line contact over an area contact apply to the surfaces 270, 260 and 206, 204, as well.

Note that in alternative embodiments, the contoured alignment surface 220 may be machined directly in the cathode block or in an intermediate component such as a Torlon™ polyamide insulator 266, as depicted in FIG. 2. Machining both contoured alignment surfaces 220, 270 in a single setup is desirable to minimize setup errors.

In one embodiment, the electrode 230 includes a threaded surface 280 and a deformable surface, such as a lip, manufactured from a high porosity sintered metal such as oxygen-free copper. The threaded surface 280 engages a cooperating thread 290 of a cathode block 292. The cathode block 292 is constructed from a material, such as brass or plated brass, that is harder than the electrode material. The difference in hardness prevents deformation of the cathode block 292 when the electrode 230 is installed.

By threadedly attaching the electrode 230 to the cathode block 292, the electrode 230 is axially retained and properly spaced from the nozzle 250 during torch operation. The engagement of the threaded surface 280 with the cooperating thread 290 also serves as an electrical connection to conduct the requisite current between the cathode block 292 and electrode 230. Presently available plasma arc torches employ alternative electrical contacts between the electrode 230 and the cathode block 292. For example, a band of conductive material such as a Louvertac™ band (manufactured by AMP, Inc., Harrisburg, Pa.) may be placed between the electrode 230 and the cathode block 292. In higher power applications, the current may be typically on the order of about 400 amperes or higher. This current is too large to be handled by reasonably sized Louvertac™ bands that fit within the torch body.

As discussed above, it is important to align the axis of the electrode 230 as closely as possible with the torch axis 214. Because screw threads, even those that are precision machined, include some radial tolerance, the use of the threaded surface 280 with the cooperating thread 290 is insufficient to afford this alignment. Screw threads can also be too tight, causing the threaded surface 280 and the cooperating thread 290 to seize. By adding the contoured surfaces described above, embodiments of this invention ensure the proper alignment. Furthermore, the combination of the contoured surfaces with the threaded surface 280 and the cooperating thread 290 ensures radial errors will not be converted in to axial errors. Such a conversion is a typical shortcoming of configurations that use contoured surfaces alone.

Experimental data detailing Total Indicator Run-out ("TIR") between the tip of the electrode 230 and the orifice of the nozzle 250 have been collected. The data reveal that electrodes threadedly attached to the cathode block, without the use of the contoured surfaces described above, demonstrate an average TIR value of about 0.0063 inches (0.016 cm). Installing the same electrodes using a torque that exceeded the normal 30 in-lb value resulted in an improved average TIR value of about 0.0029 inches (0.007 cm). Nevertheless, applying this amount of torque requires different tools than those normally used to install electrodes and electrodes replaced conventionally in the field are generally not subject to torque requirements.

In comparison, electrodes that do incorporate the contoured surfaces and are threadedly attached to the cathode block using typical installation tooling and torque demonstrate an average TIR value of about 0.0010 inches (0.003 cm). Thus, TIR is reduced by 83% compared to the case of the electrodes lacking contoured surfaces that were installed using a normal amount of torque. (The TIR reduction is 67% when compared to the instance where the torque exceeded the normal 30 in-lb value.) The TIR reductions represent a three- to five-fold improvement in alignment.

The axial location of the tip of the electrode 230 relative to the nozzle 250 influences the voltage necessary to generate a pilot arc. For a given voltage, small variations in axial location ranging from about 0.003 inches (0.008 cm) to about 0.004 inches (0.010 cm) are tolerable. Larger variations in axial location require an adjustment of the initial voltage required to strike the pilot arc in fixed electrode and nozzle designs.

Axial location of the electrode 230 in the torch 210 is determined in conventional torches typically by an axial stop on the electrode 230. The electrode 230 includes a radially disposed flange 294 that abuts a radial face 296 of the cathode block 292. The flange 294 acts as an axial stop for the electrode 230 when inserted in the block 292. If either the contoured mating surface 240 or contoured alignment surface 220 is mismachined, the flange 294 limits excess travel of the electrode 230. A suitable overtravel tolerance, such as about 0.003 inches (0.008 cm) to 0.005 inches (0.013 cm) is typical.

Axial location of the nozzle 250 in the torch 210 is determined in conventional torches typically by an axial stop on the nozzle 250. Referring again to the torch 10 in FIG. 1, the nozzle liner 24*a* and shell 24*b* include a nesting flange 42 and ridge 44. The flange 42 acts as an axial stop for the nozzle 24, abutting swirl ring 40, when nozzle 24 is captured in the torch 10 by inner retaining cap 46 that typically threadedly engages the body 30. A similar axial stop configuration may be provided for nozzle 250 in torch 210 to prevent overtravel in the case of mismachining, although any of a variety of alternative configurations may be employed.

A further embodiment of the invention includes the additional feature of either the first consumable component (e.g., electrode 230) or second consumable component (e.g., nozzle 250) being axially translatable. A purpose of this feature is to provide for contact starting of the torch 210, as discussed above with reference to U.S. Pat. Nos. 5,994,663 and 4,791,268. Briefly, contact starting involves conducting an electrical current through the electrode 230 and nozzle 250 while they are in physical contact. At the same time, a plasma gas is supplied to a plasma chamber defined by the electrode 230, nozzle 250, and swirl ring 202. Contact starting is achieved when the buildup of gas pressure in the plasma chamber is sufficient to separate the electrode 230 and nozzle 250. Typically, a spring element biases the electrode 230 and nozzle 250 in an axial direction, forcing them into physical contact. The electrode 230 and nozzle 250 separate when the gas pressure overcomes the spring force, leaving a pilot arc flowing between them. At that point, the torch 210 may be brought into proximity with the workpiece and the pilot arc transferred to the latter. Axial alignment of the consumables is provided by the mating contact between surfaces 220 and 240, or the mating contact between surfaces 270 and 260, or both, at the travel limits of the respective consumables.

Figure 6:
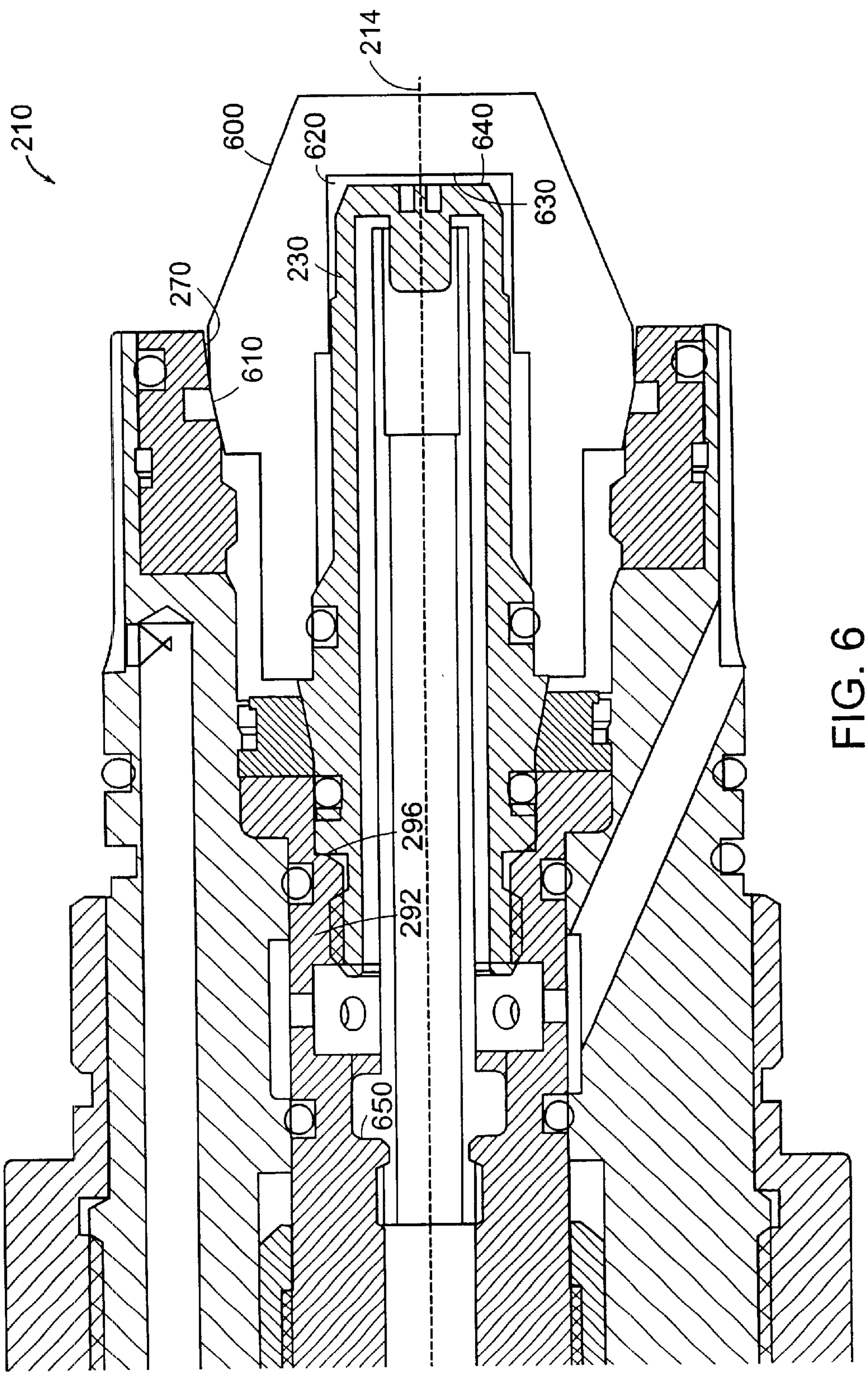
FIG. 6 is a schematic sectional view of a portion of a plasma arc torch showing a tool used to install and align an electrode within the torch in accordance with an embodiment of the present invention.

Another embodiment of the invention is shown in FIG. 6. For convenience, components in FIG. 6 that are similar to components in FIG. 2 are assigned the same reference designators and different components are assigned different reference designators. This embodiment includes a tool 600 for installing and aligning a consumable component (e.g., electrode 230) with the axis 214 of a plasma arc torch 210. As stated earlier, the alignment of the consumable with the axis 214 is important to proper torch operation and long life. When installing a consumable component, such as an electrode, that lacks the contoured edge 240, it is possible to introduce a tilt or skew in the axis of the consumable component relative to the torch axis 214. To avoid this problem, the body of the tool 600 includes a contoured surface 610. The contoured surface 610 mates with the second contoured alignment surface 270, or another alignment surface of the torch 210. The tool 600 also includes a bore 620 that is sized to receive the consumable component (e.g., electrode 230). Within the bore 620 is a drive surface 630 that mates with a keyed surface 640 of the consumable. The keyed surface 640 may be a standard hex design or a proprietary design. The latter allows a manufacturer to control the types of consumables installed in the plasma arc torch 210 with the tool 600.

When the tool 600 is placed over the consumable component, the drive surface 630 engages the keyed surface 640. The resulting assembly is then placed inside the body of the torch 210 so the contoured surface 610 contacts with the second contoured alignment surface 270. As the consumable component is installed, for example, by threadedly attaching into the cathode block 292, the contoured surface 610 rotates and is guided by the second contoured alignment surface 270. This action centers the consumable component in the body of the torch 210 and ensures the axis of the consumable component will coincide with the torch axis 214. When the consumable component is properly seated, the tool 600 is removed. To maintain alignment after removal of the tool 600, the consumable component may include a deformable surface or lip that conforms to the cathode block 292, for example at radial face 296, when the consumable is seated and tightened.

Figure 7:
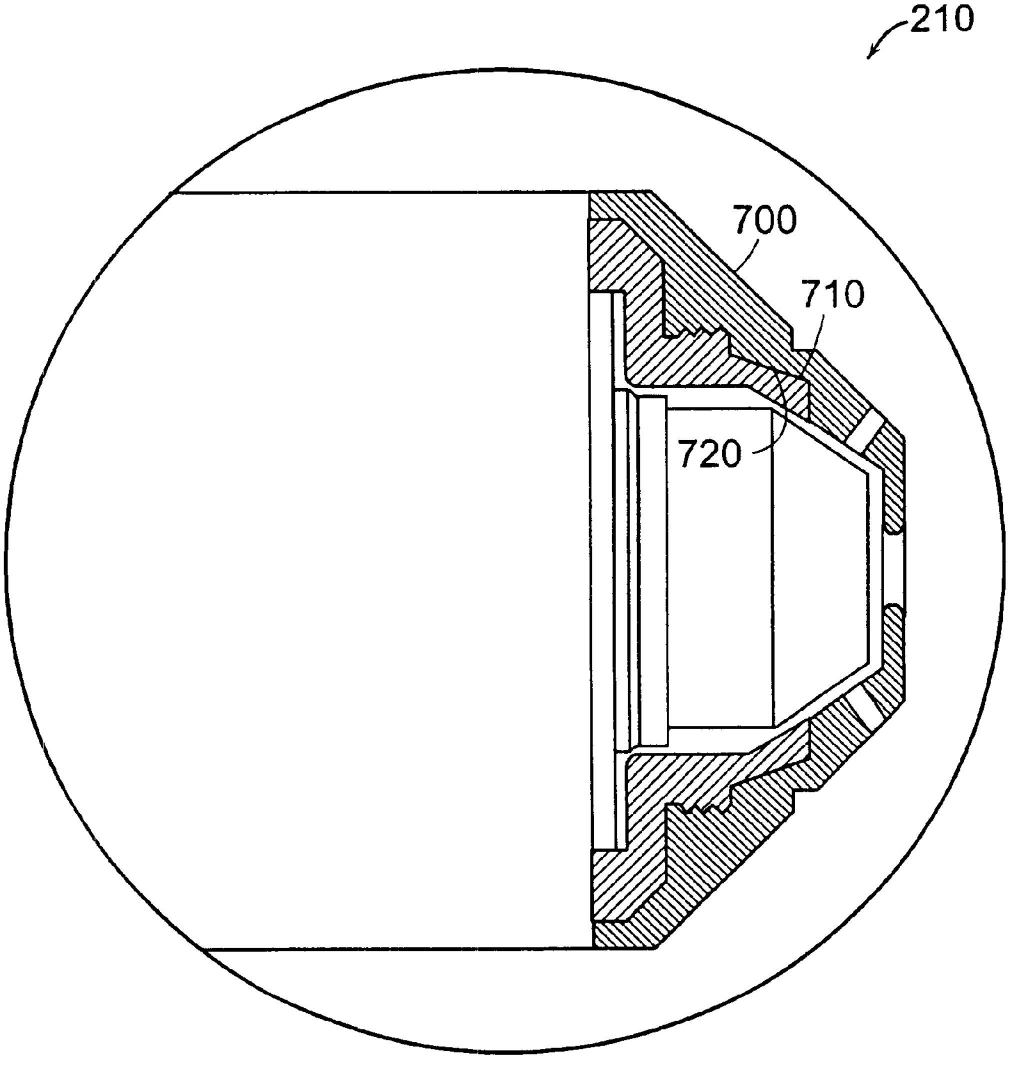
FIG. 7 is a schematic sectional view of a portion of a plasma arc torch with a radially centered shield in accordance with an embodiment of the present invention.

A further embodiment of the invention having certain additional features is shown in FIG. 7. Specifically, a radially centered shield 700 is shown affixed to the torch 210. A threaded surface of the shield 700 may be used to engage a cooperating thread on the torch 210. Alternatively, the shield 700 may incorporate a press-on configuration to affix itself to the torch 210.

The shield 700 is the outermost component of the output structure of the torch 210. During torch operation, the shield 700 is subjected to harsh conditions, including high temperatures and other physical stresses. Consequently, the shield 700 degrades over time and eventually must be replaced, typically in the field.

As stated above, axial alignment of the consumable components with the axis of a plasma arc torch is important to proper torch performance. To facilitate alignment of the shield 700 with the torch axis 214, an inner surface of the shield 700 includes a contoured mating surface 710, the contour having an axial extent of less than about 0.5 inches (1.27 cm). The contoured mating surface 710 mates with a contoured alignment surface 720 of adjacent structure (e.g., nozzle 250). When the shield 700 is installed on the torch 210, the surfaces 710 and 720 mate, thereby causing the axis of the shield 700 to align with the nozzle axis and, consequently, the torch axis 214.

FIG. 7 depicts the contour mating surface 710 as having a linear taper surface. In this configuration, the taper angle formed between contour mating surface 710 and the axis of the shield 700 is less than about 45 degrees. The contour mating surface 710 could also take the form of an arcuate section with a predetermined radius of curvature, thereby providing the previously discussed advantages of line contact over area contact.

Lastly, in another embodiment, alignment of the consumable components may be achieved contemporaneously with the manufacture of the torch 210. In this embodiment, the torch 210 is mounted in a special fixture that is attached to a lathe, milling machine, or other suitable machine tool. The electrode 230 is then installed in the torch 210 and machined while in place. Similarly and subsequently, the nozzle 250 is installed in the torch 210 and machined while in place. A shield 700, if required, can then be installed. The resulting torch 210 exhibits optimum alignment.

From the foregoing, it will be appreciated that the output structure provided by the invention affords a simple and effective way to ensure the proper alignment of consumable components in the output structure of a material processing apparatus, such as a plasma arc torch or laser. The problems of securing the critical alignments while operating under harsh field conditions, compounded by the need to replace components as they deteriorate from use, are largely eliminated. This avoids the unacceptable production errors affecting workpieces caused by improperly aligned apparatus.

The tool described above facilitates the installation of preexisting consumable components that lack certain improvements described herein. The tool offers the advantage of aligning the consumable component during installation without extra effort by the operator. As in the case above, unacceptable production errors affecting workpiece dimensions are reduced or eliminated.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes which come within the meaning and range of equivalency of the claims are therefore intended to be embraced therein.

What is claimed is:

1. A nozzle comprising a body forming an axis, the nozzle having a proximal end and a distal end forming an orifice, the body having an outer surface contoured over a predetermined axial extent thereof for mating with adjacent structure when installed in a plasma arc torch, so as to align the axis of the nozzle with an axis of the plasma arc torch, wherein the outer surface diverges from the axis along at least a portion of the axis from the proximal end to the distal end.

2. The nozzle of claim 1, wherein the predetermined axial extent is less than about 0.5 inches (1.27 cm).

3. The nozzle of claim 1, wherein the nozzle further comprises a threaded surface for engaging a mating threaded surface of the adjacent structure when installed in the torch.

4. The nozzle of claim 1, wherein the contoured outer surface comprises a linear taper surface.

5. The nozzle of claim 4, wherein an angle formed between the taper surface and the axis is less than about 45 degrees.

6. The nozzle of claim 1, wherein the contoured outer surface comprises an arcuate section having a predetermined radius of curvature.

7. The nozzle of claim 1, further comprising an integral spring element.

8. The nozzle of claim 1, wherein the nozzle is translatable generally along the axis of the nozzle when installed in the plasma arc torch.

* * * * *